May 9, 1939.　　　R. H. CASLER　　　2,157,592

GEAR SHIFTING MECHANISM

Filed Nov. 20, 1935　　　3 Sheets-Sheet 1

Inventor

Roger H. Casler

Attorney

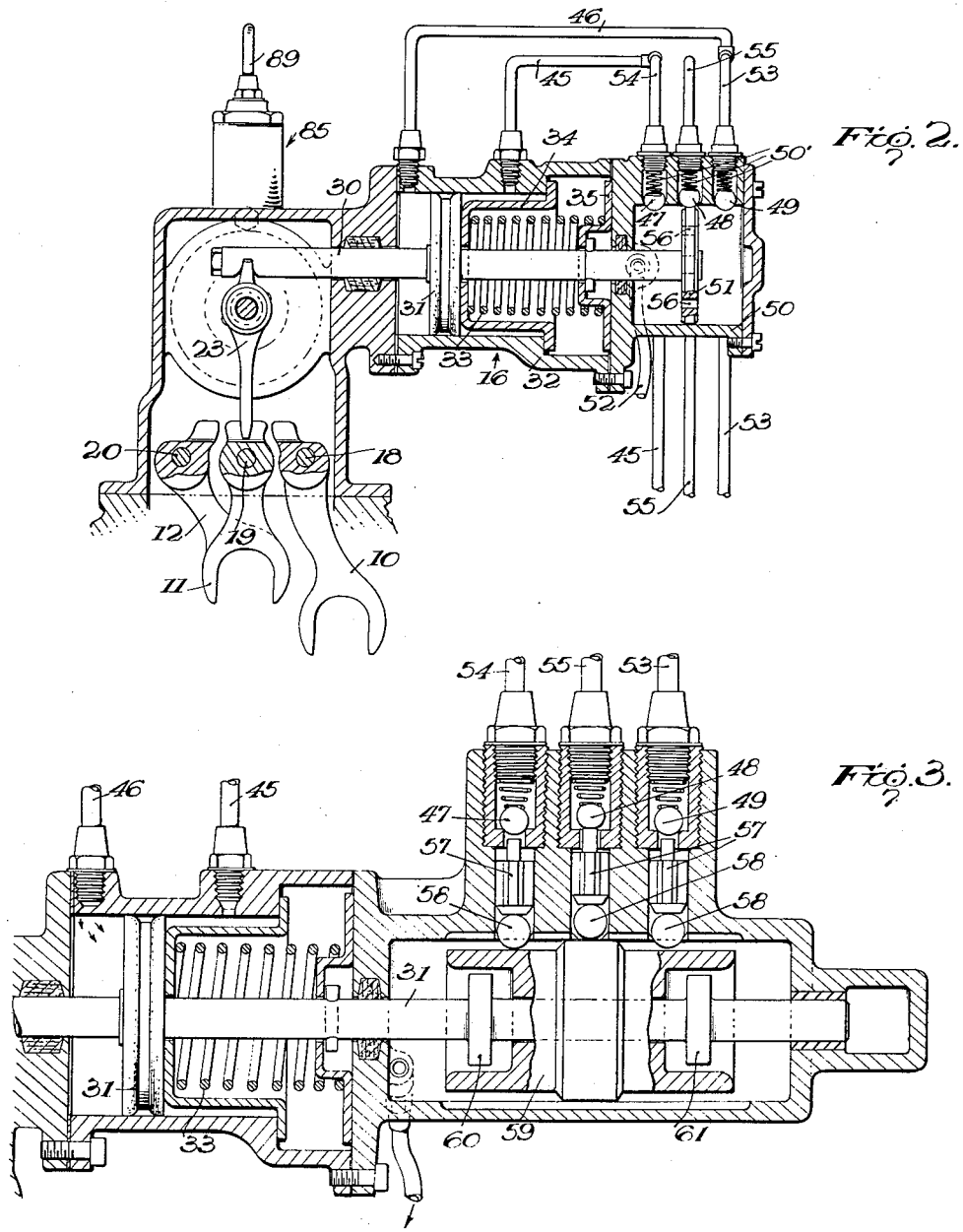

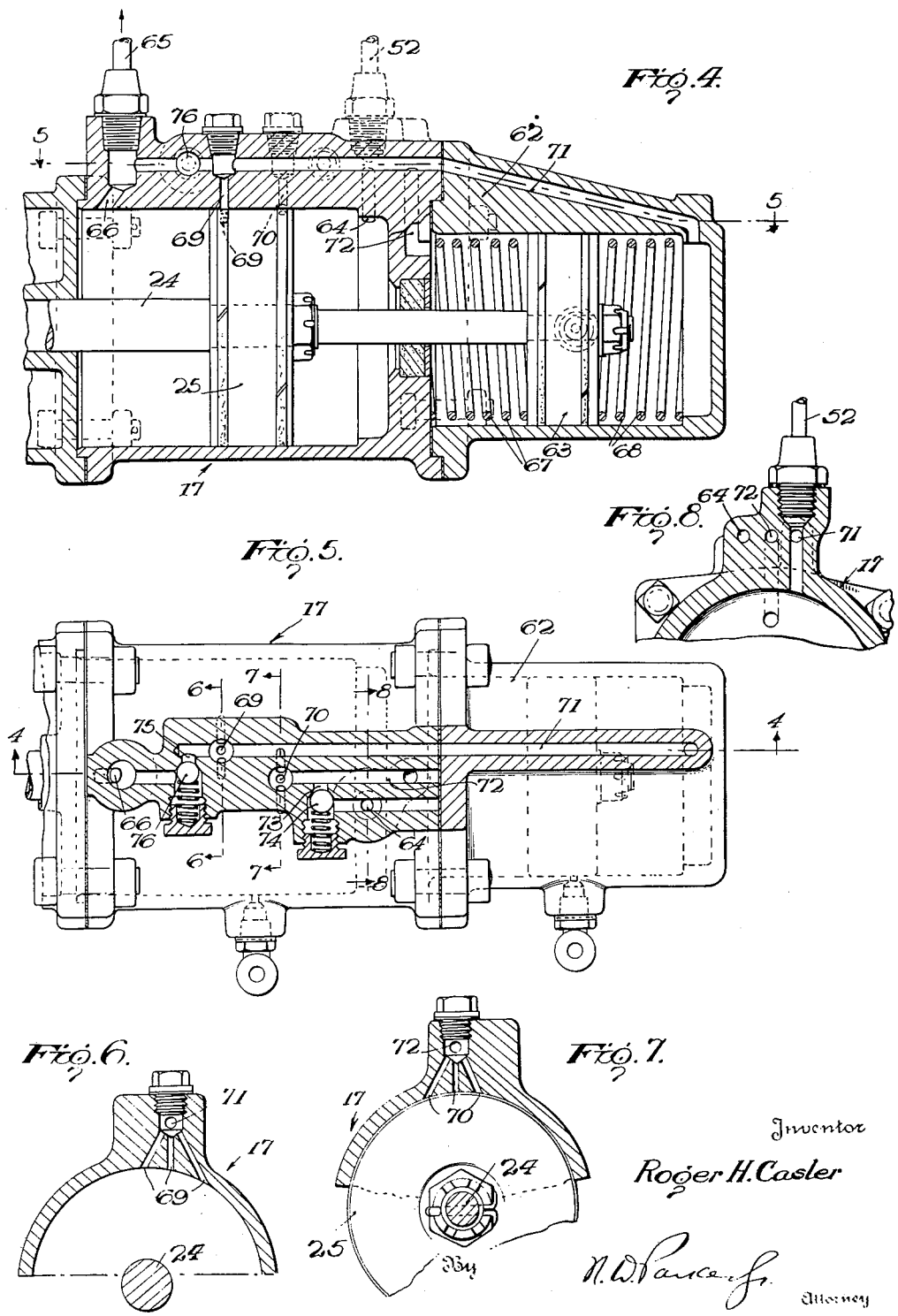

Patented May 9, 1939

2,157,592

UNITED STATES PATENT OFFICE 2,157,592

GEAR SHIFTING MECHANISM

Roger H. Casler, Pittsburgh, Pa., assignor to Bendix-Westinghouse Automotive Air Brake Company, Pittsburgh, Pa., a corporation of Delaware Application November 20, 1935, Serial No. 50,772

22 Claims. (Cl. 74—335)

This invention relates to control mechanisms and more particularly to mechanisms for controlling the selection and establishment of various gear relations of automotive vehicle transmission gearing.

One of the objects of the present invention is to provide a novel shifting and controlling mechanism for a transmission gearing so constituted that the changes in gear ratios may be efficiently effected from a remote control station.

Another object of the invention is to provide a novel controlling mechanism for a transmission of the type having a shifting member oscillatable to select and shiftable to establish a desired gear relation, which mechanism is so arranged as to be movable in one direction only to cause combined oscillating and shifting movement of the shifting member.

Another object is to provide, in a mechanism of the above character, a novel gear shifting apparatus so arranged that selection of a desired gear relation is positively assured prior to establishment of such relation.

Still another object is to provide a power-operated gear shifting mechanism wherein the movement of the transmission gears into engagement under the influence of the power apparatus is cushioned or checked in a novel manner, such checking movement being effected at a time when the selected gear relation is about to be established.

A further object is to provide a cushioning or checking mechanism, in a combination such as that above described, which shall function in accordance with the pressure of the power fluid utilized in the power-operated gear shifting apparatus, thus insuring a direct relation between the power employed for shifting and the power used for cushioning to the end that a uniform operation may be obtained.

A still further object is to provide, in a device of the above character, a novel valvular mechanism controlled by movement of the selecting actuator for supervising the flow of fluid pressure to the shifting actuator in such a manner that selection of a desired gear relation is assured prior to energization of the shifting actuator, thereby eliminating the possibility of shifting into a gear relation which is not desired.

Other objects and novel features of the invention will appear more fully hereinafter from the following detailed description when taken in connection with the accompanying drawings, wherein a preferred embodiment of the invention is illustrated. It is to be expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Fig. 2 is an axial sectional view of the selector piston and cylinder arrangement with one form of valve mechanism for controlling the shifting cylinder;

Fig. 3 is an axial view of a modified form of valve mechanism for controlling the shifting cylinder;

Fig. 4 is an axial sectional view of the shifting cylinder and associated cushioning mechanism;

Fig. 5 is an axial sectional view taken along lines 5—5 of Fig. 4;

Fig. 6 is a transverse sectional view taken along lines 6—6 of Fig. 5;

Fig. 7 is a transverse sectional view taken along lines 7—7 of Fig. 5, and

Fig. 8 is a transverse sectional view taken along lines 8—8 of Fig. 5.

Figure 1:
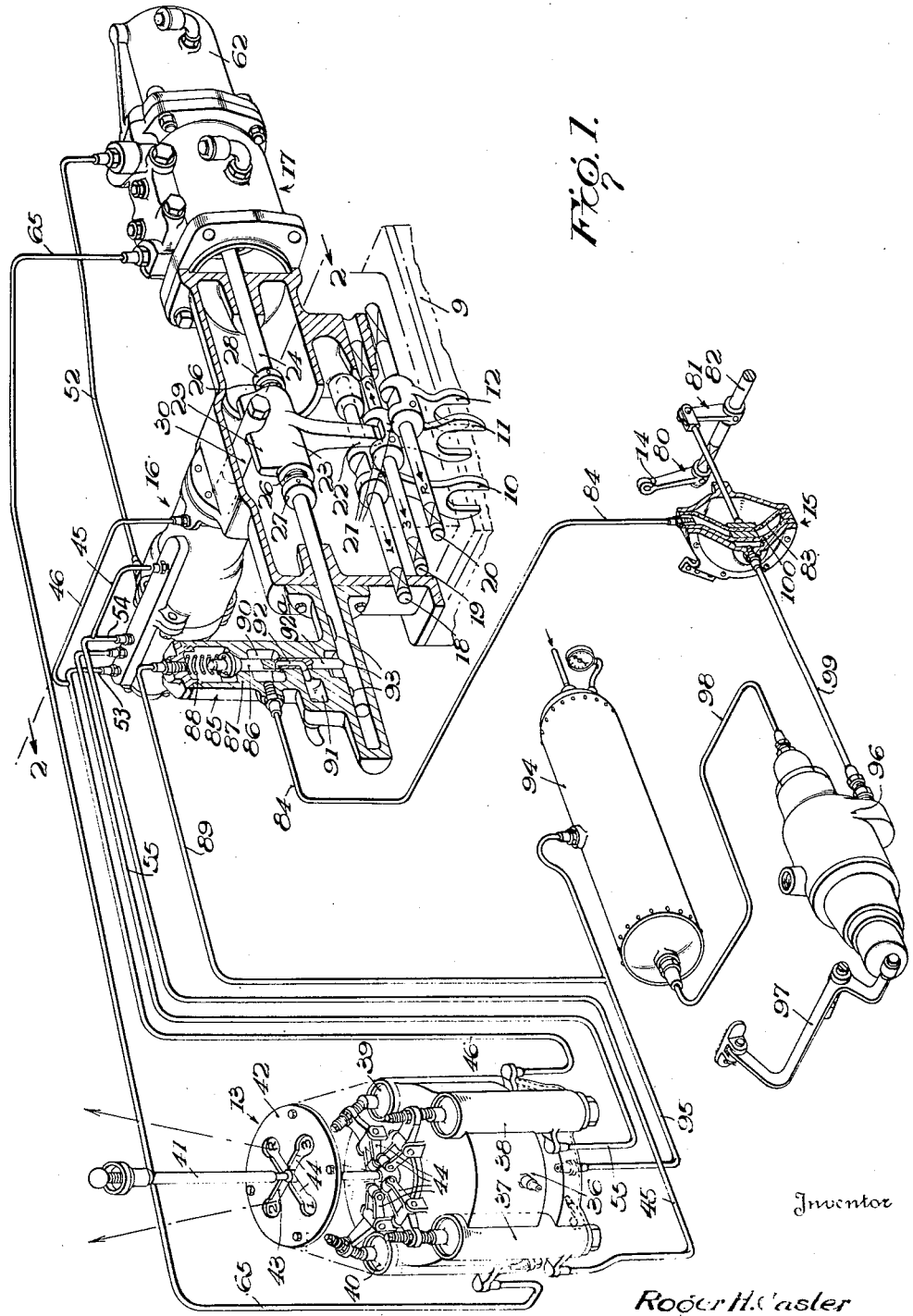
Fig. 1 is a diagrammatic view, partly in section, illustrating an automotive vehicle transmission control mechanism constructed in accordance with the principles of the present invention.

Referring more particularly to Fig. 1, a transmission control mechanism constructed in accordance with the present invention is illustrated therein in connection with a vehicle transmission gearing 9 of any well known type and including shifter forks 10, 11 and 12 engaged with the transmission gears or clutches, not shown, and operable in the usual manner to establish a desired gear relation. Preferably, the selection and establishment of the desired gear relation is effected through a power-operated mechanism remotely controlled through an operator-controlled unit 13, there being also provided a vehicle clutch-controlling element 14 and a fluid pressure-controlled actuator 15 therefor which is incorporated in the transmission control system in a manner which will appear more fully hereinafter.

For the purpose of remotely effecting a selection and establishment of a desired gear relation, under the control of unit 13, the present invention provides a selecting fluid pressure actuator 16 and a shifting fluid pressure actuator 17 which are associated with the usual shifter bars 18, 19 and 20 of the vehicle transmission 9. As shown, these bars carry the shifter forks 10, 11 and 12 which are provided with the customary slotted members 21, adapted to be selectively engaged by the lower end portion 22 of a combined selector and shifter finger or member 23, the latter being slidably mounted on a piston rod 24 of a piston 25 and normally resiliently centered as by means of springs 26 disposed between two collars 27, 28 secured to said piston rod. The foregoing construction is such that some lost motion exists between the piston rod 24 and the finger 23, permitting movement of the former prior to movement of the latter. The finger 23 is, moreover, provided with an elongated flanged extension 29 having a suitable connection with a piston rod 30 carried by a piston 31, the last named piston being associated with the selector actuator 16 while the piston 25 is associated with the shifting actuator 17.

The actuator 16 is adapted to control the selecting movements of the member 23 through the connections above described, and in order to secure such control, the same is adapted to be supplied with fluid pressure from the remotely-positioned controlling device 13. The actuator 16, as shown in Fig. 2, includes a cylinder 32 housing the piston 31, and in order that the latter may be normally centered with respect to the cylinder, for the purpose of maintaining the shifting finger 23 in a neutral position, as shown in Fig. 2, a suitable precompressed resilient device such as a spring 33 is employed, the expansion of said spring in opposite directions being limited by means of cups 34 and 35. In assembling the parts of the actuator 16, the spring 33 is placed under a slight initial compression, and from this construction, it will be readily observed that the piston 31 is resiliently maintained in a central or neutral position in the cylinder 32 when fluid pressure is exhausted from both ends of the latter.

The remotely-positioned, manually-operable transmission control device 13 is located conveniently to the operator of the vehicle and is constituted by a suitable casing 36 housing a plurality of similar valve mechanisms 37, 38, 39 and 40. These valve mechanisms are adapted to be selectively operated as by means of a manually-operable control lever 41, the movements of which are suitably guided as by means of a slotted cover 42 on the casing 36. As shown, the cover 42 is provided with right-angularly intersecting slotted portions 43 and 44, but it will be readily understood that other suitable guiding slots may be provided in the cover for controlling the selection and establishment of a desired gear relation depending upon the particular vehicle transmission utilized. In the present invention, movement of the control lever 41 to the left and right in slot 44 establishes first and reverse gear relations respectively while movement of the control lever to the left and right in slot 43 establishes second and third gear relations respectively. Such movements of the control lever operate the respective control valves through suitable cam-controlled rocker arms 44, such operation resulting from the fact that the control lever is pivoted in the casing 36 below the points of engagement of the same with the said rocker arms. The specific structure of the valve mechanisms 37, 38, 39 and 40 may be of any suitable type, but are preferably constructed as disclosed in the patent to Oliver K. Kelley No. 2,071,538 granted February 23, 1937.

In order to control the flow of fluid pressure to the selecting actuator 16 to effect selection of the desired shifter bar in accordance with controlling movements of the lever 41, opposite ends of the said actuator are connected to the valve mechanisms 37 and 39 through conduits 45 and 46 respectively. In this manner, it will be readily perceived that movement of the control lever 41 in the slot 44 to effect operation of valves 37 and 39 will control the flow of fluid pressure to opposite sides of the piston 31 in order to effect selection of shifter bar 18 or 20.

Associated with the selector actuator 16 is a valve mechanism for controlling the flow of fluid pressure to the shifting actuator 17 during certain desired shifting movements of the latter, such valve mechanism being employed for the purpose of insuring selection of the desired shifter bar before energization of the shifting actuator, as well as insuring neutralization of the gear relations between the establishment of successive gear relations. Fig. 2 illustrates one form of such valve mechanism and includes ball valves 47, 48 and 40 adapted to be received in valve housings formed in a cylinder 50, suitably secured to one end of the cylinder 32. Each of these valves is resiliently urged to its seat as by means of springs 50' and is adapted to be selectively opened as by means of a valve-operating member 51 secured to the piston rod 30 and slidable within cylinder 50. Each of the valves 47, 48 and 49 when opened by the member 51 is adapted to supply fluid pressure to the cylinder 50 which communicates with one end of the shifting actuator 17 through conduit 52. As shown in Figs. 1 and 2, the conduit 46 supplies fluid pressure to the valve chamber above valve 49 through the branch conduit 53, the conduit 45 supplies fluid pressure to the valve chamber above the valve 47 through branch conduit 54 while the valve chamber associated with valve 48 receives fluid pressure through conduit 55 directly from valve 38. Irrespective of the actuation of any of the valves 47, 48 or 49, the pressures upon either side of the member 51 are balanced by reason of openings 56 therein. By the use of this arrangement, actuation of the valve elements has no effect in tending to move the selector piston 31 longitudinally in the cylinder 32.

From the above described construction, it will be readily understood that in the event valve 37 is actuated and fluid pressure is conducted through conduit 45 to the right-hand end of actuator 16, as viewed in Fig. 2, the piston 31 will be moved to the left in order to effect selection of the shifter bar 18 through the shifter fork 10. Fluid under pressure will not be conducted to the shifting actuator 17, however, until the aforesaid selection is made and the valve-actuating member 51 has moved to engage ball valve 47 and unseat the same. This action will conduct fluid pressure through conduits 45 and 54 directly to the cylinder 50 and to the right-hand end of the shifting actuator 17 through conduit 52, see Fig. 1. On the other hand, actuation of valve 39 will serve to conduct fluid pressure through the conduit 46 to the left-hand end of the selector actuator 16, as viewed in Fig. 2, to effect selection of the shifter bar 20 through shifter fork 12, and here again fluid pressure will not be conducted to the shifting actuator until the valve-actuating member 51 has moved sufficiently to open the ball valve 49 to connect the cylinder 50 with the conduit 46 through the branch conduit 53. The aforesaid movements of the selector actuator, respectively selecting shifter bars 19 and 20, are responsive to the movement of the control lever 41 to the left and right in slot 44. Upon subsequent operation of the shifting actuator 17, as will be more clearly pointed out hereinafter, first and reverse gear relations are established without further operation of the control lever.

In Fig. 3, there is illustrated a slightly modified form of valve mechanism for controlling the flow of fluid pressure to the shifting actuator 17. In this form of the invention, the ball valves 47, 48 and 49 are adapted to be moved from their seats by means of fluted members 57 which are moved upwardly by the contact between balls 58 and a valve-actuating element 59. The latter is not fixedly secured to the piston rod 30 as in the form previously described in connection with Fig. 2, but is slidable thereon between two heads 60 and 61, this construction enabling a slight amount of movement of the selector piston 31 prior to shifting movement of the member 59. In this manner, a more precise centering of the selector piston is assured prior to the actuation of the valves 47, 48 or 49 which control the flow of fluid pressure to the shifting actuator to the end that any possibility of supplying fluid to the latter when the selector piston is not quite in neutral position is avoided.

One of the features of present invention resides in the provision of a device for cushioning the movement of the shifter actuator at a time when the gear relation is about to be established, such construction avoiding the undue stress and strain which might otherwise be present in establishing a gear relation by means of power. Preferably, the construction affording this desirable result is fluid pressure-operated and is constituted, Fig. 4, by a cylinder 62 having a piston 63 slidable therein and secured to the piston rod 24, the said piston 63 being of smaller cross-sectional area, however, than the piston 25. In order to supply cushioning fluid to either side of the piston 63, an arrangement is provided whereby the fluid pressure which actuates piston 25 in opposite directions is conducted to opposite sides of the piston 63 after the piston 25 has moved a sufficient distance that the gear relation is about to be established.

Referring more particularly to Figs. 4 and 5, the conduit 52 communicates with the right-hand portion of actuator 17 through a bore 64 while a conduit 65, connecting the valve 48 of control unit 13 with the actuator 17, communicates with the left-hand portion of the latter through a bore 66. The piston 25 normally occupies a central neutralized position through the medium of any suitable arrangement such as centering springs 67 and 68 associated with the cushioning cylinder 62, and in this position, covers a series of ports 69 and 70 positioned in the side wall thereof. Ports 69 when uncovered establish communication between the interior of the actuator 17 and the right-hand portion of cylinder 62 through a duct 71 while ports 70 serve to connect the left-hand end of cylinder 62 to the actuator 17 through a duct 72. The last named duct is adapted to communicate with the bore 64 through an intercommunicating passage 73, a check valve 74 being interposed therein, however, which prevents passage of fluid from bore 64 to duct 72 via said passage. The duct 71 likewise is adapted to communicate with bore 66 through interconnecting passage 75, check valve 76 being disposed in said passage and preventing fluid from passing from bore 66 to duct 71.

From the foregoing, it will be readily understood that in the event fluid pressure is conducted to the left-hand end of actuator 17 to effect movement of the piston 25 therein to the right, as viewed in Fig. 4, the initial movement of the said piston will be unimpeded until the ports 69 have been uncovered. Fluid pressure will then flow through said ports and through duct 71 to the right-hand portion of cushioning cylinder 62 and the action of the fluid pressure upon the piston 63 will cushion the remaining portion of the stroke of the piston 25. When conduit 65 is exhausted to atmosphere, the fluid pressure within cushioning cylinder 62 will be exhausted to the conduit 65 through duct 71, passage 75 and check valve 76, and the piston assembly comprising pistons 25 and 63 secured to the piston rod 24 will be returned to the neutral position indicated in Fig. 4 by means of the expansion of spring 68. On the other hand, fluid pressure admitted through conduit 52 to the right-hand portion of the actuator 17 will effect a movement of the piston 25 to the left until ports 70 are opened and the interior of the actuator is connected to the left-hand portion of the cylinder 62 through said ports and duct 72. This pressure will be exhausted to the conduit 52, when the latter is exhausted, through duct 72, passage 73 and check valve 74. It will thus be seen that the above described arrangement provides a dashpot for cushioning the movement of the actuator which establishes the gear relations, the cushioning effect being obtained from the fluid pressure which shifts the actuator piston, thus avoiding the use of supplementary oil dashpots and the like. It will be understood that the ports 69 and 70 are so positioned with relation to the piston 25 that the above described cushioning function of the piston 63 is effective to retard or cushion the movement of the shifter piston at the time the gear relation selected is about to be established, thus insuring a quiet and efficient shifting of the transmission gears.

It is highly desirable in installations of this character that the vehicle clutch be automatically disengaged prior to the establishment of a desired gear relation. This avoids the necessity of an operator manually operating a clutch pedal. To this end, see Fig. 1, the vehicle clutch-controlling member 14 is adapted to be actuated by means of the fluid pressure actuator 15 through connections 80, 81 and 82, the said actuator including a diaphragm 83 secured to the connection 80 and adapted to be supplied with fluid pressure through conduit 84 by means of a valve mechanism 85. The latter includes a combined inlet and exhaust valve member 86 slidably received in a casing 87 and normally urged as by a spring 88 to close off communication between conduits 89 and 84. The casing 87 is provided with a chamber 90 communicating with conduit 84 and this chamber, in the position shown in Fig. 1, communicates with an exhaust chamber 91 through a duct 92 formed in a valve member 92a slidable in casing 87. The latter is so formed at its lower end portion as to engage suitable notches 93 provided in the piston rod 24, the construction being such that upon movement of the latter, the valve member 92a will be cammed upwardly to close off the exhaust duct 92 and move the valve 86 to open position whereby the valve establishes communication between the conduit 89 and the valve chamber 90. Fluid pressure is thus supplied to the diaphragm 83 and effects clutch-disengaging movement of the clutch member 14. As soon as the piston rod 24 is moved to such a position, however, as to effect registry of one of the slots 93 with the lower end of the valve member 82a, the latter and the valve 86 will be returned to the position shown in Fig. 1, thus exhausting the fluid pressure from the diaphragm 83 to the conduit 84, chamber 90, duct 92 and chamber 91, permitting the clutch to be reengaged through the action of the usual clutch return springs. A suitable reservoir of fluid pressure 94 is connected with conduit 89 and this reservoir also supplies fluid pressure to the device 13 through conduit 95.

From the above described construction of the valve mechanism 85, it will be observed that due to the interposition of springs 26 between collars 27 and 28 and the shifting finger 23, and the lost motion existing between the latter and said collars, initial movement of the shifter piston rod 24 in either direction will effect clutch-disengaging movement of the member 14 prior to shifting movement of the shifting finger 23. This arrangement insures automatic disengaging of the clutch prior to actual shifting movement of a selected shifter bar.

In the event that it is desired to manually control the operation of the vehicle clutch, a supplemental valve mechanism 96, which may be constructed in any suitable manner, is provided, controlled by a manually-operable pedal 97 to admit fluid pressure from the reservoir 94 through conduits 98 and 99 to a second diaphragm 100 contained within the actuator 15. Fluid pressure admitted to such diaphragm will effect combined movement of the diaphragms 100 and 83 in order to effect clutch-disengaging movement of the clutch member 14.

In operation, assuming the parts occupy the neutral position indicated in the drawings, movement of the control lever 41 to the left-hand extremity of slot 44 serves to operate valve 37 and admit fluid pressure from the reservoir 94 to the selector actuator 16 through conduits 95 and 45. Movement of the piston 31 in the actuator 16 responsive to the fluid pressure conducted thereto, will effect oscillating movement of the selector finger 23 to cause the lower end portion 22 thereof to select the shifter bar 18 through engagement of portion 22 with the slot 21 of the shifter fork 10. At the time the shifter bar 18 is selected, referring to Fig. 2, the valve 47 controlling the flow of fluid pressure to the shifting actuator 17 will be opened by the valve-actuating member 51 connected with the selector piston 31, and fluid pressure will be conducted through said valve to the right-hand portion of the shifting actuator 17 via the conduit 52, the fluid pressure so conducted effecting shifting movement of the piston rod 24, member 23 and shifter bar 18 to the left, as viewed in Fig. 1, to establish first gear relation.

It will be noted, however, that in view of the fact that the member 23 is connected to the piston rod 24 through a lost motion connection, the initial movement of the piston rod will merely serve to compress springs 26 disposed upon either side of the member 23, and the latter will not be moved until a predetermined degree of movement of the piston rod 24 has taken place. During this predetermined degree of movement of the piston rod 24, the valve-actuating element 92a is cammed upwardly to effect operation of the valve 86 in order to supply fluid pressure to the diaphragm 83 from the reservoir 94 by way of conduits 89 and 84. As heretofore described, this action will cause a clutch-disengaging movement of the clutch-controlling element 14, thus insuring disengagement of the clutch prior to shifting movement of the member 23 and shifter bar 18 selected thereby.

As heretofore pointed out, checking or cushioning means is associated with the shifting actuator 17 in order to retard that portion of the movement of the actuator when gear engagement is being actually effected. Referring to Figs. 4 and 5, as soon as the shifting actuator piston 25 has moved sufficiently to the left to uncover ports 70 in the wall of the shifter actuator cylinder, fluid pressure from the latter will be conducted to the left-hand end of the cushioning cylinder 62 by way of port 70 and duct 72. Since the cushioning piston 63 is of smaller cross-sectional area than the shifter piston 25, the action of the fluid pressure against the cushioning piston will serve to retard or check the remainder of the stroke of the shifter piston, thus insuring that actual engagement of the selected transmission gears will be effected without undue clashing.

Near the limit of the stroke of the shifter piston 25 and after the actual engagement of the transmission gears is effected, the valve-actuating element 92a, see Fig. 1, becomes aligned with one of the slots 93 which is positioned closest to the member 23. When this occurs, the valve 86 closes through the action of spring 88, and conduit 84 is connected to the exhaust chamber 91 through duct 92, fluid pressure being exhausted from the diaphragm 83 and permitting the vehicle clutch to return to engaged position through the action of the usual clutch-return springs. This engaging operation of the vehicle clutch may be manually graduated if desired through the pedal 97, it being understood that as the gear relation is being established, operation of the pedal 97 will cause the valve 96 to function to admit fluid pressure to the diaphragm 100. Such fluid pressure may be released by proper manual manipulation of the pedal 97 controlling the valve 96 in order to secure a proper graduated engagement of the vehicle clutch.

In the event that it is desired to now establish the second gear relation, the control lever 41 is returned to the neutral position indicated in Fig. 1 and moved to the left-hand extremity of the slot 43. As soon as the control lever 41 moves to the neutral position, the valve 37 exhausts to atmosphere, thus exhausting conduits 45 and 52. Referring to Figs. 4 and 5, this action enables the cylinder 62 to communicate with the conduit 52 through duct 72, passage 73, check valve 74 and bore 64 and fluid pressure is thus exhausted from the cushioning cylinder. The shifting actuator 60 is likewise exhausted through the bore 64, and the centering or neutralizing springs 67 and 68 promptly return the shifter piston to the centralized neutral position indicated in Fig. 4, it being understood that the shifter bar 18 is likewise returned to neutral position. During this movement of the shifter piston rod 24, the valve 86 is operated in the same manner as heretofore described in order to effect clutch-disengaging movement of the clutch-controlling member 14 prior to actual shifting movement of the shifter bar 18 and also to cause engaging movement of the clutch-controlling element 14 when the shifter bar 18 is returned to neutral position.

As soon as the shifter bar 18 and selector finger 23 are neutralized, the lower portion 22 of the said finger is enabled to be moved into engagement with the central shifter bar 19 by reason of the action of the neutralizing spring 33 associated with the selector piston 31. This last named operation completes the neutralization of the transmission. The movement of the control lever in slot 43 as indicated above operates valve 40 to admit fluid pressure directly to the left-hand end of the shifter actuator 17 through conduit 65 in order to effect shifting movement of the member 23 and shifter bar 19 to the right, as viewed in Fig. 1, thus establishing second gear relation. During the initial movement of the shifter piston, the vehicle clutch is disengaged as heretofore described and thereafter the gear relation is established, the same being checked by the functioning of the cushioning cylinder 62.

Third gear relation is established by movement of the control lever to the right-hand extremity of slot 43, as viewed in Fig. 1, which causes shifting movement of the shifter bar 19 to the left, as viewed in said figure. During establishment of the third gear relation, no movement of the selector piston 31 takes place and fluid pressure is conducted directly to the right-hand portion of the shifter actuator through the open valve 48 indicated in Fig. 2.

Selection and establishment of reverse gear relation is effected through movement of the control lever 41 to the right-hand extremity of slot 44, such movement establishing sequential selection of the shifter bar 20 and shifting of the latter to the left, as viewed in said figure. Fluid pressure under these conditions is conducted to the shifting actuator 17 through operation of valve 49, effected by movement of the selector piston 31 to the right, as viewed in Fig. 2.

There is thus provided by the present invention a remotely-controlled vehicle gear-shifting mechanism which not only involves a relatively simple construction but which is most efficient in operation. The provision of the valvular mechanism operated by the selector actuator for controlling the flow of fluid to the shifting actuator insures complete selection of the desired shifter bar prior to actual shifting movement thereof. The construction provided moreover enables the actual engagement of the transmission gears to be cushioned or checked, thus resulting in a smoothly and quietly operating mechanism. A further feature accomplished by the present invention is that of automatically disengaging the vehicle clutch by the valvular mechanism operated by the shifter piston, this arrangement avoiding the necessity of the operator disengaging the clutch when a gear relation is to be selected and established.

While two modifications of the invention have been shown and described herein, it is to be understood that the same is not limited thereto but may be embodied in various forms as well understood by those skilled in the art. It will be furthermore understood that certain parts may be used without others if desired, without departing from the spirit of the invention. Reference will, therefore, be had to the appended claims for a definition of the limits of the invention.

What is claimed is:

1. A power-operated control mechanism for a transmission gearing of the type having a combined selector and shifter member movable to select and shiftable to establish a desired gear relation comprising power means for effecting selecting movement of said member, a separate power means for effecting shifting movement of said member a manually-operable member for controlling the flow of energy to said first named power means, valvular means separate from said first named power means for controlling the flow of energy to said second named power means, and means movable by said first power means for directly operating said valvular means.

2. A power-operated control mechanism for a transmission gearing of the type having a combined selector and shifter member movable to select and shiftable to establish a desired gear relation comprising fluid power means for effecting selecting movement of said member, a separate fluid power means for effecting shifting movement of said member, manually-operable means for controlling the flow of fluid pressure to said first named power means, valve means positioned exteriorly of said first named power means for controlling the flow of fluid pressure to said second named power means, and means movable by said first power means for directly operating said valve means.

3. A power-operated control mechanism for a transmission gearing of the type having a combined selector and shifter member movable to select one of a pair of shifter bars and shiftable with the selected bar to establish a desired gear relation comprising a double-acting fluid-operated motor including a cylinder and piston, means for operatively connecting said piston and member, resilient means associated with said motor and normally maintaining said piston in centered position whereby said member will be positioned between said bars, manually-operable means for selectively controlling the flow of fluid pressure to either end of said cylinder to effect selection of one or the other of said shifter bars, a separate fluid-operated motor for shifting said member and the selected bar to establish the desired gear relation, valvular mechanisms for controlling the flow of fluid pressure to said separate motor, and means movable by said piston at opposite ends of its stroke for directly operating said valvular mechanisms.

4. A power-operated control mechanism for a transmission gearing of the type having a combined selector and shifter member movable to select one of a pair of shifter bars and shiftable with the selected bar to establish a desired gear relation comprising a double-acting fluid-operated motor including a cylinder and piston, means for operatively connecting said piston and member, resilient means associated with said motor and normally maintaining said piston in centered position whereby said member will be positioned between said bars, manually-operable means for selectively controlling the flow of fluid pressure to either end of said cylinder to effect selection of one or the other of said shifter bars, valvular mechanism communicating with opposite ends of said cylinder, a separate fluid-operated motor for shifting said member and the selected bar to establish the desired gear relation, and means operated by said piston for directly operating said valvular mechanism for controlling the flow of fluid pressure to said separate motor.

5. In a control mechanism for a vehicle gearing apparatus having a selector and shifter member normally occupying a neutral position, means for mounting said member adjacent said apparatus, a fluid power-operated device for oscillating said member in either of opposite directions to select a desired gear ratio, a separate fluid-operated device for shifting said member to establish the selected gear ratio, manually-operable means to control the application of fluid pressure to said first device, and means operable by said first device for establishing communication between said second device and said manually-operable means independently of the first device whereby fluid pressure is conducted to the second device.

6. The combination with a shifter bar of an automotive vehicle transmission gearing, of a power-operated device for effecting shifting movement of said bar in opposite directions to establish either of a pair of selected gear ratios, and means comprising a double-acting fluid pressure-operated device associated with said first device to retard further movement of the first named device only after sufficient movement of the latter and bar has taken place that the gear relation is about to be established.

7. The combination with a shifter bar of an automotive vehicle transmission gearing, of a fluid pressure-operated device for effecting shifting movement of said bar in opposite directions to establish either of a pair of selected gear ratios, and means associated with said device and operable after a predetermined degree of movement of said device for retarding the remaining movement thereof comprising a second fluid pressure-operated device, and means for conveying fluid from said first device to said second device.

8. The combination with a shifter bar of an automotive vehicle transmission gearing, of a fluid-operated device for effecting shifting movement of said bar in opposite directions to establish either of a pair of selected gear ratios, and means separate from said device and operable to retard the movement of said device throughout a portion of its stroke comprising means operable by said device at a predetermined point in the stroke thereof for controlling the flow of fluid to said retarding means.

9. The combination of a shifter bar of an automotive vehicle transmission gearing, of a fluid-operated device for effecting shifting movement of said bar in opposite directions to establish either of a pair of selected gear ratios, a second fluid-operated device for retarding movement of said shifter bar throughout that portion of its stroke when gear engagement is taking place, and means operable at a predetermined point in the stroke of said first device for admitting fluid to said second device.

10. The combination of a shifter bar of an automotive vehicle transmission gearing, of a fluid-operated device for effecting shifting movement of said bar in opposite directions to establish either of a pair of selected gear ratios, a second fluid-operated device operatively connected with said first device, and means operable after a predetermined movement of said first device for admitting fluid to said second device for opposing continued movement of said devices, whereby gear-engaging movement of said shifter bar is cushioned when the gear ratio is being established.

11. The combination of a shifter bar of an automotive vehicle transmission gearing, of a fluid-operated device for effecting shifting movement of said bar in opposite directions to establish either of a pair of selected gear ratios, said device including a piston, a second fluid-operated device having a piston connected with the first piston, means for admitting fluid to the first device, and means operable after a predetermined amount of movement of the first piston for admitting fluid to the second device.

12. In a vehicle transmission gear shifting apparatus having a member movable in opposite directions to establish different gear relations, a fluid-operated actuator including relatively movable piston and cylinder members for moving said member in opposite directions, a cushioning actuator associated with said first actuator, and means for conducting fluid from said first actuator to said second actuator only after a predetermined degree of relative movement between said piston and cylinder members has taken place.

13. In a vehicle transmission gear shifting apparatus having a member movable in opposite directions to establish different gear relations, a fluid-operated actuator including relatively movable piston and cylinder members for moving said member in opposite directions, means for admitting fluid pressure to said actuator, means including a dashpot for checking such relative movement between said piston and cylinder members, and means controlled by one of said members after a predetermined degree of relative movement between said members has taken place for admitting fluid pressure to said checking means.

14. In a vehicle transmission gear shifting apparatus having a member movable in opposite directions to establish different gear relations, a fluid-operated actuator including relatively movable piston and cylinder members for moving said member in opposite directions, means for admitting fluid pressure to said actuator, means including a dashpot for checking such relative movement between said piston and cylinder members, and means controlled by one of said members after a predetermined degree of relative movement between said members has taken place for connecting said checking means and actuator whereby fluid pressure is conducted from the latter to the former.

15. In a vehicle transmission gear shifting apparatus having a member movable in opposite directions to establish different gear relations, a fluid-operated actuator including relatively movable piston and cylinder members for moving said member in opposite directions, means for admitting fluid pressure to said actuator, means for checking such relative movement between said piston and cylinder members including a cylinder having a piston therein, said last named piston being connected with said actuator piston and of smaller cross-sectional area than the latter, and means controlled by one of said members after a predetermined degree of relative movement between said members has taken place for admitting fluid pressure to said checking means.

16. In a control mechanism for a power-operated gear shifting device having a member oscillatable to select and shiftable to establish a desired gear relation, a double-acting fluid actuator for oscillating said member in opposite directions, means for selectively controlling the admission of fluid pressure to either end of said actuator, a second fluid actuator for shifting said member, valve means for controlling the flow of fluid to said second actuator, and means including a valve-actuating element movable by said first actuator for directly operating said valve means.

17. In a control mechanism for a power-operated gear shifting device having a member oscillatable to select and shiftable to establish a desired gear relation, a double-acting fluid actuator including a pressure-responsive member for oscillating said member in opposite directions, means for selectively controlling the admission of fluid pressure to either end of said actuator, a second fluid actuator for shifting said member, valve means for controlling the flow of fluid to said second actuator, and means including a valve-actuating element associated with said pressure-responsive member through a lost motion connection for operating said valve means.

18. In a control mechanism for a power-operated gear shifting device having a member movable to select and shiftable to establish a desired gear relation, a double-acting fluid actuator including a pressure-responsive member for moving said member in opposite directions, means for selectively controlling the admission of fluid pressure to either end of said actuator, a second fluid actuator for shifting said member, a plurality of valve mechanisms for controlling the flow of fluid to said second actuator, and means movable by said pressure-responsive member for selectively and directly operating said valve mechanisms.

19. For use with change speed gearing having synchronizing mechanism associated therewith, fluid pressure actuated gear changing means including a pair of pressure responsive devices coupled together for action in opposition, means effecting the application of fluid pressure to one of said devices and other means controlled by the response of the last mentioned device for diverting the application of fluid pressure therefrom to the other of said devices.

20. In combination with change speed gearing having speed synchronizing mechanism, of a fluid pressure gear changing system including a primary piston and cylinder, a secondary piston and cylinder having an effective surface area differing from that of the primary piston and cylinder, a connection between said pistons for their unisonal movement, means supplying fluid under pressure to the primary cylinder and a communicating conduit between said cylinders controlled by the position of the primary piston to open or close said conduit for the flow of fluid under pressure from the primary cylinder to the secondary cylinder for action on the secondary piston.

21. In combination with change speed gearing having speed synchronizing mechanism, of a fluid pressure gear changing system including a pair of differential size pistons arranged in tandem, pressure cylinders enclosing said pistons for movement in unison, means for introducing fluid under pressure to one of the cylinders to move the piston therein and means communicating said cylinders after a given movement of said piston for introducing fluid pressure into the other cylinder for action on the piston therein to retard the rate of piston travel.

22. In combination with a gear shifting mechanism having a plurality of elements movable to establish different gear relations, a member operable in one direction to select one of said elements and movable in another direction to move said selected element to establish a desired gear relation, fluid pressure means to operate said member in said one direction, a fluid motor to operate said member in said other direction, and means for controlling the fluid pressure energization of said fluid pressure means and motor comprising manually-operable valve mechanism, means connecting said valve mechanism to said fluid pressure means, means including a pair of valve devices to connect said valve mechanism and fluid motor, and a cam operable by movement of said fluid pressure means for directly operating said valve devices.

ROGER H. CASLER.